United States Patent [19]

Pfandl et al.

[11] Patent Number: 5,608,832
[45] Date of Patent: Mar. 4, 1997

[54] OPTICAL CABLE HAVING A PLURALITY OF LIGHT WAVEGUIDES ARRANGED IN A PRESCRIBED STRUCTURE AND HAVING DIFFERENT MECHANICAL SENSITIVIES

[75] Inventors: Walter Pfandl, Ahorn; Reiner Schneider, Ebersdorf; Waldemar Stoecklein, Coburg; Clemens Unger, Roedental; Ernst Opel, Schwarzenbach A.D. Saale, all of Germany

[73] Assignee: Siemens Aktiengesellschaft, Munich, Germany

[21] Appl. No.: 529,910

[22] Filed: Sep. 18, 1995

Related U.S. Application Data

[63] Continuation of Ser. No. 223,670, Apr. 6, 1994, abandoned.

[30] Foreign Application Priority Data

Apr. 14, 1993 [DE] Germany ............................ 43 12 121.7
Feb. 11, 1994 [DE] Germany ............................ 44 04 441.0

[51] Int. Cl.⁶ ..................................................... G02B 6/44
[52] U.S. Cl. ........................... 385/112; 385/105; 385/110; 385/114
[58] Field of Search ..................................... 385/110, 111, 385/112, 113, 114, 127, 126, 109, 106, 105

[56] References Cited

U.S. PATENT DOCUMENTS

| | | | |
|---|---|---|---|
| 3,883,218 | 5/1975 | Slaughter | 385/114 |
| 3,937,559 | 2/1976 | Ferrentino et al. | 385/114 |
| 4,110,001 | 8/1978 | Olszewski et al. | 385/114 |
| 4,679,897 | 7/1987 | Driskel | 385/114 |
| 4,828,349 | 5/1989 | Nakasuji | 385/114 X |
| 4,838,643 | 6/1989 | Hodges et al. | 385/127 |
| 5,032,001 | 7/1991 | Shang | 385/127 X |
| 5,177,809 | 1/1993 | Zeidler | 385/105 |
| 5,245,134 | 9/1993 | Vana, Jr. et al. | 385/114 X |
| 5,249,249 | 9/1993 | Eoll et al. | 385/114 |
| 5,278,931 | 1/1994 | Antos et al. | 385/126 |

FOREIGN PATENT DOCUMENTS

| | | | |
|---|---|---|---|
| 0492206 | 7/1992 | European Pat. Off. | |
| 2507583 | 8/1984 | Germany | |
| 61-173207 | 8/1986 | Japan | 385/114 |
| 3-55930 | 12/1991 | Japan | |

OTHER PUBLICATIONS

Abstract of Japanese Published Application 58–150906 of Sep. 9, 1983, *Patent Abstracts of Japan*, vol. 7, No. 270 (P240) Dec. 2, 1983.

Hatano et al., "Fiber Excess Length in a Cable Containing Optical Fiber Ribbons", *Electronics & Communications in Japan/Part II: Electronics*, vol. 70, No. 9, Sep. 1987, Silver Spring, MD, pp. 82–90.

Yamauchi et al., "Fiber Stresses Induced by Twisting a Fiber Tape and the Reduction by 'Pre–Twisting Method'", *Optical Communications Conference*, 17–19 Sep. 1979, Amsterdam, pp. 8.5–1 to 8.5–4.

Hatano et al, "Multi–Hundred–Fiber Cable Composed of Optical Fiber Ribbons Inserted Tightly Into Slots", *International Wire & Cable Symposium Proceedings*, 1986, pp. 17–23.

Hogari et al, "Residual Strain Characteristics of Optical Fiber Ribbons Inserted Tightly Into Slots", *The Transactions of the IEICE*, vol. E 71, No. 7, Jul. 1988, pp. 688–692.

Wenski et al, "Fiber Strain During Cable Pulling: An Important Factor in Cable Design", *International Wire & Cable Symposium Proceedings*, 1989, pp. 368–372.

(List continued on next page.)

Primary Examiner—Rodney B. Bovernick
Assistant Examiner—Hemang Sanghavi
Attorney, Agent, or Firm—Hill, Steadman & Simpson

[57] ABSTRACT

An optical cable comprises a plurality of light waveguides which are arranged at least one group with a prescribed structure. The light waveguides will have different mechanical sensitivities, with the waveguides having a low mechanical sensitivity being in those regions of the structure which have elevated mechanical stressing occurring.

35 Claims, 6 Drawing Sheets

OTHER PUBLICATIONS

D. Marcuse, "Microbending Losses of Single–Mode, Step–Index and Multimode, Parabolic–Index Fibers", *The Bell System Technical Journal,* vol. 55, No. 7, Sep. 1976, pp. 937–955.

Su–Vun Chung, "Macrobend Loss of 1300nm Optimized Single Mode Fibre at 1550nm", *International Wire & Cable Symposium Proceedings 1988,* pp. 704–709.

Sutton et al., "Development of a non–destructive Test for Microbend Loss Mechanisms in Cabled Fibre", *International Wire & Cable Symposium Proceedings 1989,* pp. 450–455.

Kobayashi et al, "Study of Microbending Loss in Thin Coated Fibers and Fiber Ribbons", *International Wire & Cable Symposium Proceedings 1993,* pp. 386–392.

OPTICAL CABLE HAVING A PLURALITY OF LIGHT WAVEGUIDES ARRANGED IN A PRESCRIBED STRUCTURE AND HAVING DIFFERENT MECHANICAL SENSITIVIES

This is a continuation of application Ser. No. 08/723,670, filed Apr. 6, 1994 abandoned.

BACKGROUND OF THE INVENTION

The present invention is directed to an optical cable having a plurality of light waveguides which are arranged in at least one group having a prescribed structure and wherein the individual light waveguides within the prescribed structure are each respectively exposed to different mechanical stresses.

It is known to manufacture optical cables with a great plurality of light waveguides wherein the light waveguides are arranged group-by-group in a defined structure. One possibility for such a prescribed structure, for instance, is the arrangement of light waveguide ribbons within a stack in what is referred to as a chambered cable. U.S. Pat. No. 5,177,809, whose disclosure is incorporated herein by reference thereto and which claims priority from the same German Application as European Published Application 0 492 206 A 1, provides an example of such a structure wherein the number of light waveguides within a ribbon stack forming a group additionally increases from the inside to the outside in order to achieve a higher packing density.

In such a group having prescribed structures which are usually arranged proceeding helically relative to the longitudinal axis of the cable, it is no longer possible for the individual light waveguides to evade mechanical stresses by assuming a position with a lower stress because they are largely mechanically bound at prescribed positions within the prescribed structure. Such mechanical stresses, also known as micro bending or macro bending, will cause an extremely undesirable and relatively great increase in attenuation.

SUMMARY OF THE INVENTION

The object of the present invention is to provide a way to avoid an excessively great increase in attenuation due to mechanical stressing of the light waveguides which are retained in a prescribed structure.

To accomplish this goal, the present invention is directed to an improvement in an optical cable having a plurality of light waveguides which are arranged in at least one group having a prescribed structure and wherein the individual light waveguides within each structure are respectively exposed to different mechanical stresses. The improvement is that light waveguides having different mechanical sensitivities are provided within the structure and the light waveguides having the lower mechanical sensitivity are arranged in one or more regions of the prescribed structure in which the elevated mechanical stresses occur.

Whereas identical light waveguides were always employed in the known prescribed structures, for example in ribbon stacks per se or a ribbon stack within the framework of chambered cables, the invention provides that one departs from the principle of employing identical light waveguides within a given structure. Light waveguides having different sensitivities are therefore employed within the framework of the present invention so that the light waveguides that are designed for increased mechanical stressing, for example micro bending, are less sensitive thereto and are predominately arranged or introduced where the higher mechanical stresses will occur. Light waveguides that have a higher sensitivity to mechanical stresses can be utilized in those regions within the structure where the mechanical stressing of the light waveguide is lower from the very offset or does not occur. Light waveguides that are less mechanically sensitive, in fact, have somewhat higher transmission attenuations. However, this slight increase in transmission attenuation is orders of magnitude lower than the increase in attenuation as a consequence of the high mechanical stresses in light waveguides that are sensitive to mechanical stressing.

Other advantages and features of the invention will be readily apparent from the following description of the preferred embodiments, the drawings and claims.

DESCRIPTION OF THE PREFERRED EMBODIMENTS

Figure 1:
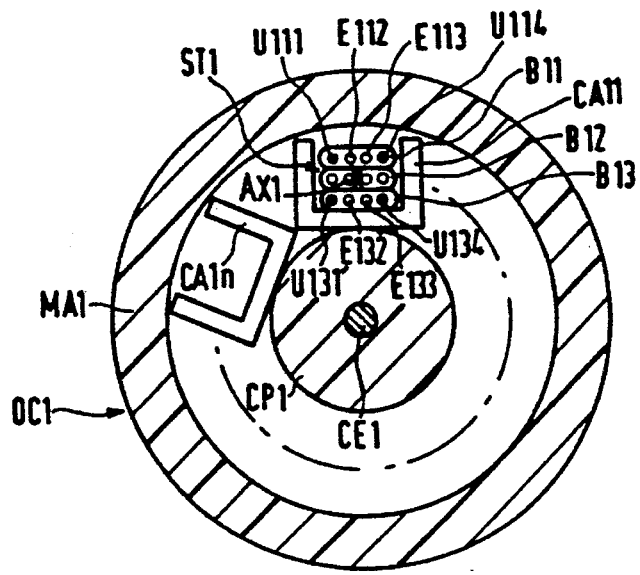
FIG. 1 is a schematic cross sectional illustration through a first light waveguide cable in accordance with the present invention.

The principles of the present invention are particularly useful when incorporated in an optical cable, which is generally indicated at OC1 in FIG. 1. The cable OC1 comprises a tensile element CE1 on which an extruded plastic layer CP1 of, for example, polyethylene is arranged. Around the extruded plastic layer CP1 are a plurality of chamber elements CA11–CA1n, each of which has approximately a U-shaped cross section (only two are shown for purposes of illustration). Within the framework of the stranding process, these chamber elements CA11–CA1n are stranded onto the support CP1 in a helical manner. In the finished cable, an outside cladding MA1 surrounds these chamber elements CA11–CA1n so that the entire interior between the cladding MA1 and the support CP1 is filled with the n number of chambered elements.

A group of light waveguides is arranged in a prescribed structure ST1 in each of the chamber elements, for example as illustrated for the chamber element CA11. In the present example, the structure ST1 in the chamber element CA11 is formed by a stack of light waveguide ribbons B11, B12 and B13, each of which respectively contains four light waveguides. As a connecting line for the respectively outwardly disposed light waveguides, the prescribed structure ST1 provides a rectangular structure.

As a consequence of the stranding procedure of the chamber elements CA11–CA1n on the support CP1, the light waveguides within the structure ST1 will experience different mechanical stressings. Essentially, these are torsion stresses due to the wrap-around of the stranding access as well as a bending stress due to the curved guidance of the helical path or web. These stresses become all the greater the greater the expanse of the structure ST1 containing the light waveguides in a radial and/or circumferential direction. Light waveguides lying farthest toward the outside are, therefore, especially stressed because they are at the greatest distance from an imaginary neutral axis AX1 both with respect to torsion as well as with respect to the bending stresses. This neutral axis AX1 lies approximately in the intersection of the diagonals of the structure ST1.

A greater mechanical stressing of the light waveguide will cause, from a specific limit value that is still permissible, a pronounced increase in the transmission attenuation of the light waveguide. In order to avoid such a deterioration of the light waveguides in the especially stressed sub-region, for example in the outermost left-hand and right-hand corners of the structure ST1, light waveguides U111 and U114 of the band or ribbon B11 are designed to be especially mechanically insensitive and are shown as dark points in FIG. 1. By contrast thereto, the light waveguides E112 and E113 on the outer ribbon B11 are shown as rings and are between the waveguides U111 and U114 and have a greater mechanical sensitivity than the light waveguides U111 and U114. Excessively high increases in the attenuation due, for example, to the stranding process or as a consequence of micro bending effect can be largely avoided in this manner.

The two outermost light waveguides U131 and U134 of the innermost ribbon B13 of the stack ST1 are also to be viewed as light waveguides that are likewise exposed to increased mechanical stressing. It can, therefore, be expedient to also provide light waveguides having especially low mechanical sensitivity for these two waveguides. However, by contrast, the two light waveguides E132 and E133 of the inner ribbon B13 lie farthest toward the inside and are less mechanically stressed since they lie closer to the neutral axis of the structure ST1. These light waveguides, therefore, will hardly increase their attenuation given mechanical stressings which, for example, occurs during stranding.

The selection of these light waveguides, for example U111–U134, that are to have a lower mechanical sensitivity within the structure is dependent on the respective parameters of the cable structure and of the stranding process. For example, the length of lay with which the individual structures are stranded will enter into a determination of an increased mechanical stressing occurring when the length of lay becomes shorter. Over and above this, the outside dimensions of the respective structure also will cause the mechanical stressing of the individual light waveguides to likewise increase in the outside regions given large structures, for example a great plurality of light waveguides within the structure. How many of the light waveguides within a structure are, therefore, to be respectively designed as mechanically insensitive light waveguides, for example U111–U134, is, thus, dependent on the configuration properties inherent in the respective structure. On a case-by-case basis, the plurality and position of the respectively especially mechanically stressed light waveguides within the structure can be calculated, in addition to using theoretical considerations, simply on the basis of practical tests, namely that the light waveguides are identified in a specimen cable that has experienced an increase in attenuation beyond a permitted limit value due, for example, to the stranding process.

Figure 2:
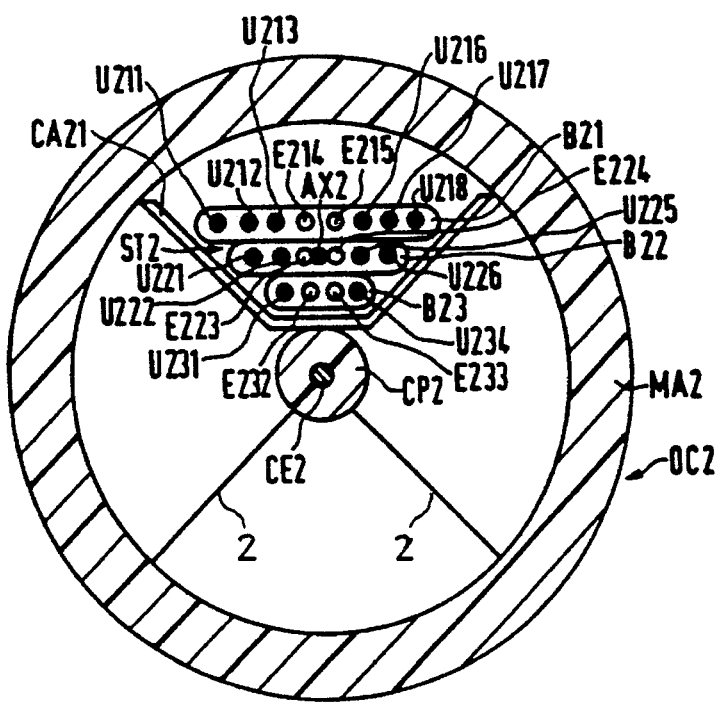
FIG. 2 is a schematic cross sectional view similar to FIG. 1 of a modification of the embodiment of FIG. 1.

FIG. 2 is a modification of an embodiment of the cable, generally indicated at OC2. The optical cable OC2 has an outside cladding MA2 and is provided with a central tensile element CE2 which has a plastic coating CP2 applied thereon. In the space between the cladding MA2 and the coating CP2, four chamber elements, such as CA21, are provided (only one is illustrated and the outline of the positions for the other three are shown by outlines 2). The chamber element CA21 includes a structure, generally indicated as ST2, which is formed by three light waveguide ribbons B21, B22 and B23 which have different numbers of waveguides.

As illustrated, the outermost waveguide ribbon B21 contains eight waveguides, the innermost ribbon B23 has four waveguides, and the intermediate ribbon B22 has six waveguides. Of the eight waveguides of the outermost ribbon B21, the three waveguides U211, U212 and U213, as well as U216, U217 and U218, respectively, lie on the outside left and outside right portions of each of the ribbons and will be exposed to particularly high mechanical stresses and, therefore, require an internal structure that will render them especially insensitive to mechanical stresses. By contrast thereto, the light waveguides E214 and E215, which are arranged in the middle of the ribbon B21, are not too far from a neutral axis AX2 of the structure ST2 and are, therefore, less mechanically stressed. Light waveguides that are distinguished by especially low sensitivity of their attenuation behavior to mechanical stresses, therefore, need not be employed for these two waveguides.

In the intermediate waveguide ribbon B22 having a total of six waveguides, the two outer waveguides on the left, U221 and U222, as well as the two on the right, U225 and U226, are fashioned as light waveguides that have especially low mechanical sensitivity, whereas the two inner light waveguides E223 and E224, which lie closer to the neutral axis AX2, can have greater sensitivity with respect to the mechanical stresses.

In the innermost waveguide ribbon B23 having a total of four waveguides, only the two outer disposed light waveguides U231 and U234 are designed as mechanically insensitive light waveguides, whereas the center two waveguides E232 and E233, which lie closer to the inside, can have a higher and greater sensitivity to mechanical stresses because they lie closer to the neutral axis AX2.

It becomes clear from the present schematic illustration of FIGS. 1 and 2 that the number and distribution of the mechanically less sensitive light waveguides U111 through U234 within a structure can be selected dependent on the mechanical stressings specifically occurring for the respective structure ST1 or ST2, whereas mechanically insensitive light waveguides are to be utilized given a greater distance from the neutral axis AX1 or AX2, respectively. Light waveguides E112 through E233 have a higher mechanical sensitivity of their attenuation behavior to mechanical stresses and are arranged in a core region around the neutral axis AX1 or AX2, respectively.

Figure 3:
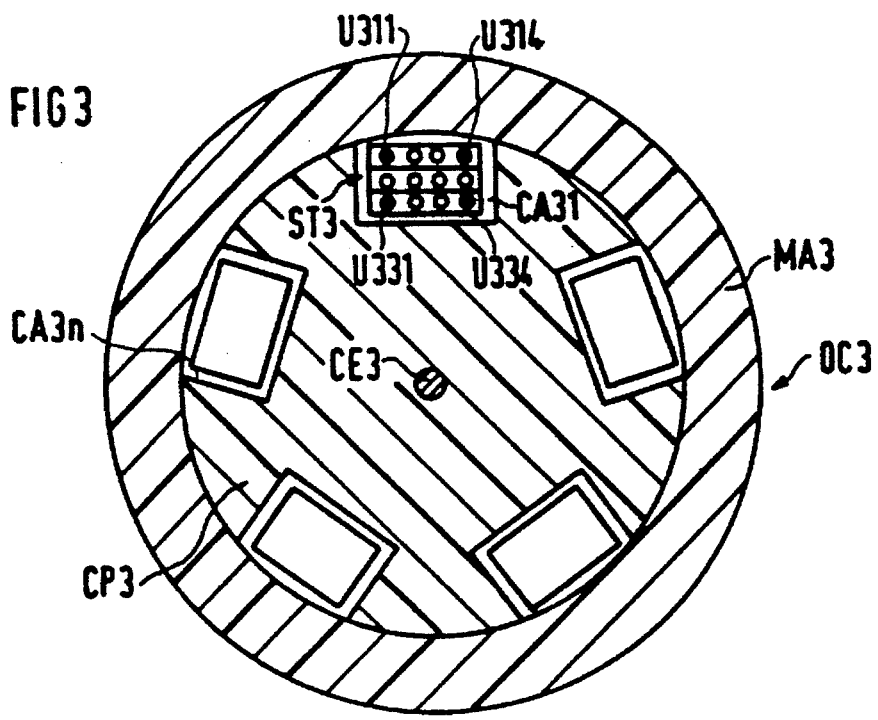
FIG. 3 is a schematic cross sectional view of another modification of the embodiment of FIG. 1.

Another embodiment of an optical cable is generally indicated at OC3 in FIG. 3 and has a large plastic member CP3 provided on a tensile core CE3. The member CP3 has a plurality (five illustrated) of rectangular chambers CA31–CA3n which are spaced around the outer surface of the member CP3. The cable OC3 has an outside cladding MA3 which is applied onto the member CP3 to cover any waveguide structures, such as ST3, provided in the chambers, such as CA31. Intermediate layers and additional covers which are not shown may be applied between the outer cladding MA3 and the member CP3. Each of the chambers CA31–CA3n is formed by helically proceeding grooves which have rectangular cross sections to form a rectangular recess for receiving the respective structure, such as ST3. As illustrated, the structure ST3 is substantially similar to the structure ST1 of FIG. 1, for example it has four light waveguides U311 through U334, arranged in the corners which are provided to be especially insensitive to mechanical stressing.

Figure 4:
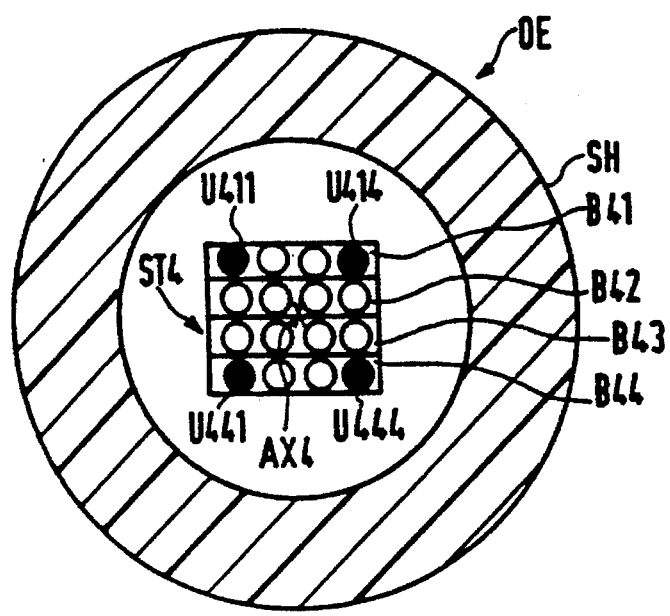
FIG. 4 is a schematic cross sectional view of a third modification of the embodiment of FIG. 1.

In FIG. 4, a stranding element, generally indicated at OE comprises an outer protective sheath SH in whose inside a structure ST4 of a total of 16 light waveguides is received. These 16 light waveguides are distributed in groups of four each into light waveguide ribbons B41–B44, wherein the light waveguides U411, U414, U441 and U444, respectively, are arranged at the corners of the structure and are light waveguides that are especially insensitive to mechanical stressing. The remaining light waveguides lying farther toward the inside of the structure ST4 are shown as circles; lie closer to the neutral axis AX4 of the structure ST4 and have greater mechanical sensitivity in comparison to the waveguides positioned in each of the four corners.

The sensitivity of a fiber to micro bending is described in the literature. For example, see *Bell Systems Technical Journal*, Vol. 55, 1976, pp. 937–955. The identification thereof can occur, for example, according to what is referred to as the "mesh wire test" as described, for example, in *International Wire and Cable Symposium*, (IWCS) Proceedings 1989, page 450. The micro bending sensitivity of a fiber or, respectively, of a light waveguide can also be characterized by what is referred to as the MAC value as described in the *International Wire and Cable Symposium*, Proceedings, 1988, pp. 704–709. The MAC value is utilized below for explaining the relationships wherein:

$$MAC = \frac{MFD}{\lambda_{ceff}}. \quad (1)$$

As derived from this equation, the bending sensitivity ($\lambda_{ceff}$= effective critical wavelength) will decrease when the mode field diameter MFD is made smaller. Optical fibers that have a defined, first refractive index for the core region and a second, defined refractive index for the cladding region generally have a MAC value that lies at approximately 7.5. When the MAC value is lowered from 7.5 to approximately 6.5, for example by reducing the mode field diameter MFD, the micro bending sensitivity is reduced by more than a factor of 2 so that such light waveguides can be exposed to elevated mechanical stresses without the occurrence of undesirable high increases in attenuation. Such light waveguides having lower MAC values, for example, particularly below 7.4 and preferably below 7.0 and, at best, even below 6.5, are especially suited for the light waveguides U111 through U444 of FIGS. 1 through 4. The difference in the MAC value of the sensitive light waveguides E112–E223 and the insensitive light waveguides U111–U444 should expediently amount to at least 0.2 and preferably more than 0.5 and, at best, more than 1.0. The above values are referenced to a $\lambda$ of 1300 nm.

The design of the optical fibers can be correspondingly modified in order to achieve the desired insensitivity of the light waveguides. Thus, for example, an increase in the difference in the refractive index between the core and the cladding of the optical fibers will yield an improvement in the guidance properties of the fibers and, thus, a lower sensitivity to bending. However, a slight increase in the attenuation generally accompanies such an improvement of the mechanical ruggedness of the optical fibers, but this is far, far lower than the increase in attenuation of a mechanically sensitive optical fiber given increased mechanical stressing.

The relationships shall be presented below in a simplified derivation that describes the above-described situation.

Figure 5:
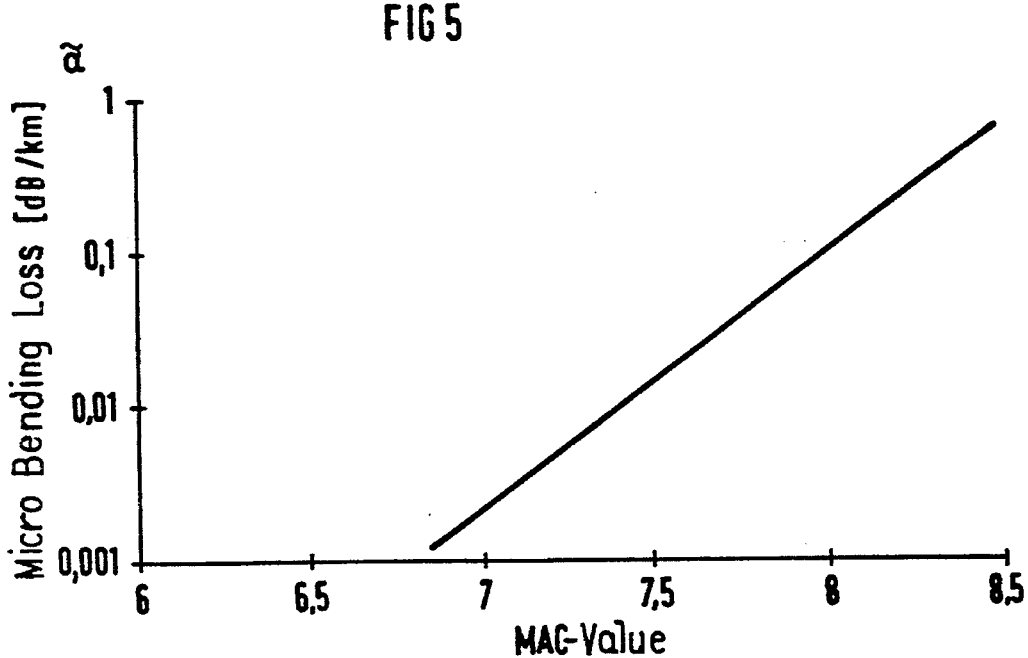
FIG. 5 is a diagram showing the relationship between MAC value and the increase in attenuation due to micro bending losses.

FIG. 5 shows a micro bending loss $\alpha$ dependent on the MAC value, namely wherein a core radius a=4 through 4.3 μm, wherein the core refractive index $n_1$ and a cladding refractive index of the light waveguides $n_2$ have a standardized difference in a refractive index $\Delta$ of 0.0033–0.0039%. With these values, $$\Delta = \frac{n_1^2 - n_2^2}{2n_1^2} \quad (2)$$

the structural parameter V is determined by the equation:

$$V = \frac{2\pi}{\lambda} \cdot a \cdot n_1 \cdot \sqrt{2\Delta} \quad (3)$$

the mode field diameter MFD is determined by the following equation:

$$MFD = 2a \left( 0.65 + \frac{1.619}{V^{1.5}} + \frac{2.879}{V^6} + \ldots \right) \quad (4)$$

attenuation due to the Rayleigh scatter $\alpha_s$ is determined by the following equation:

$$\alpha_s = (0.685 + 66 \, \Delta n) \cdot \frac{1}{\lambda^4} \quad (5)$$

The following calculations proceed on the basis of the following values:

$V_c$=2.405;

$\lambda_c=\lambda_{ceff}$+100 nm, wherein $\lambda_c$=theoretical critical wavelength;

$n_1$=1.451 for $\lambda$=1300 nm.

Following from equations 1–4:

$$\Delta = \frac{1}{2\pi^2} \cdot \frac{\lambda_c \cdot V_c}{MAC \cdot \lambda_{ceff} \cdot n_1} \cdots 0.675 + \frac{1.619}{\frac{\lambda_c V_c}{\lambda}} + \frac{2.879}{\frac{\lambda_c V_c}{\lambda}}.$$

Figure 6:
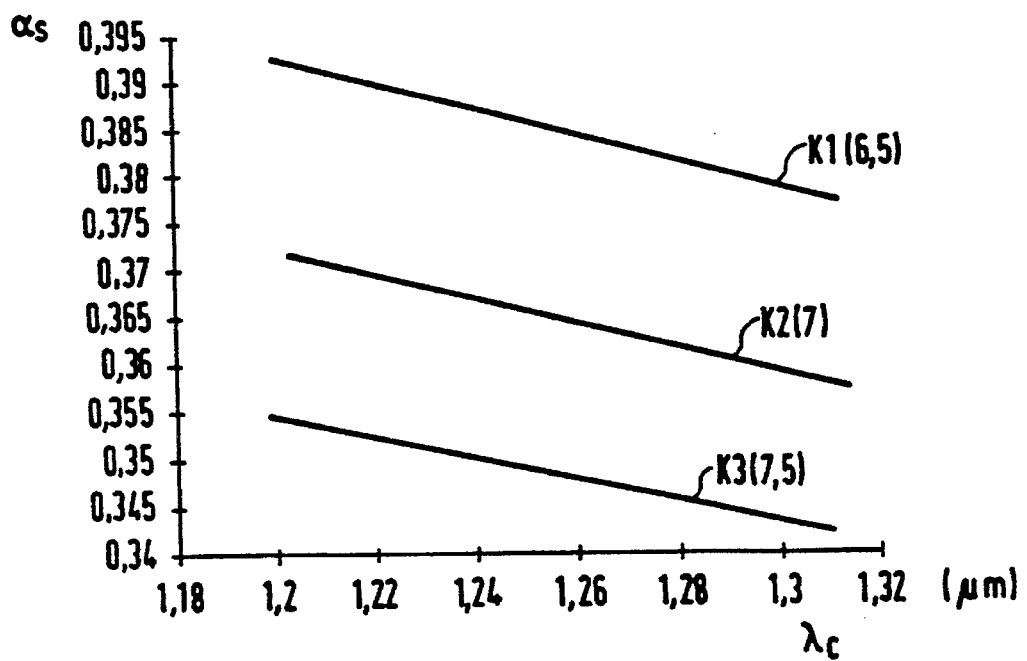
FIG. 6 is a diagram related to the attenuation curves dependent on the boundary wavelength for various MAC values.

When the standardized refractive index difference $\Delta$ is converted into a refractive index difference $\Delta_n$ and when the result is introduced into equation (5), then the dependency of the Rayleigh attenuation $\alpha_s$ shown in FIG. 6 occurs as a function of $\lambda_{ceff}$ for different MAC values, wherein the curve K1 is for MAC=6.5, the curve K2 is for MAC=7 and the curve K3 is for MAC=7.5.

One can see from FIG. 6 that the attenuation per kilometer at $\lambda_c$=1300 nm is still below 0.4 dB/km even for MAC=6.5. Compared to the attenuation value given MAC=7.5, the attenuation has risen by only approximately $5 \cdot 10^{-2}$ dB/km. The micro bending sensitivity, however, has decreased to a far greater extent.

Such a fiber is, thus, particularly suited for those positions of the cable structure wherein the fibers are subjected to greater micro bending.

Figure 7:
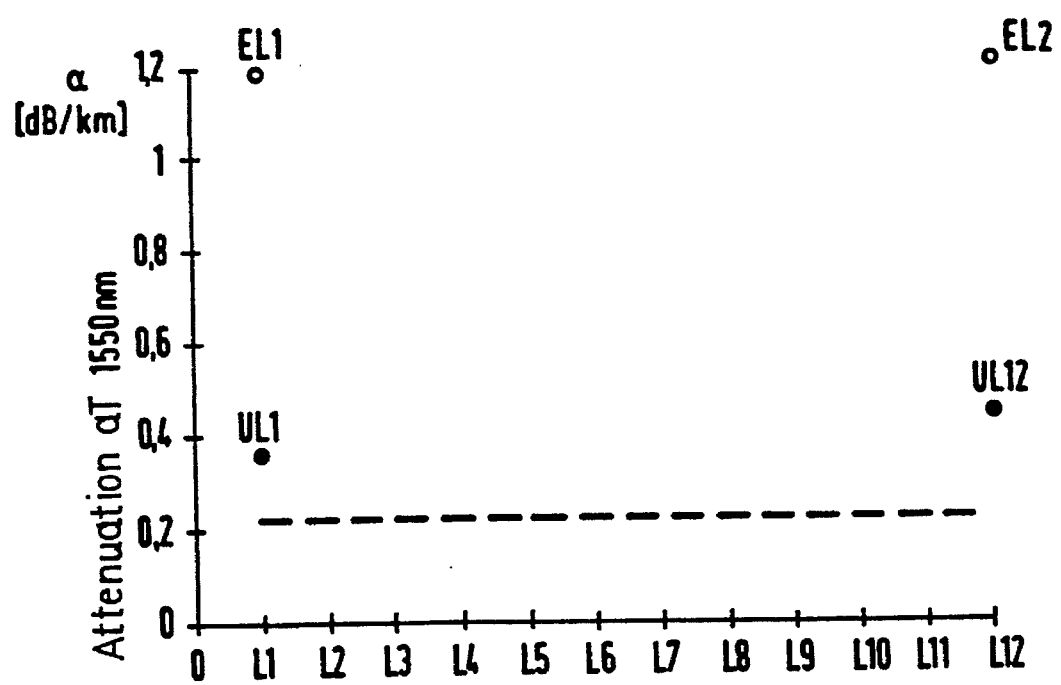
FIG. 7 is a diagram illustrating the attenuation of fibers L1 through L12 in the upper, middle and lower ribbons of a ribbons stack.

FIG. 7 shows attenuation values e of the light waveguides L1–L12 of the upper, middle and lower ribbons from a ribbon stack having 10 fiber ribbons which were in a U-profile cable shown in FIG. 4. The broken line indicates the attenuation value of the fiber ribbon in an unstressed condition, whereas all of the light waveguides L1–L12 have approximately the same attenuation of 0.2 dB/km given a wavelength of $\alpha$=1550 nm. When fibers sensitive to bending are employed, then the attenuation for the two outermost light waveguides L1 and L12 of the outer ribbon increase greatly given the described stressing, for example during the stranding itself or given an internal thermal cycling test, and lie at a value that is indicated by the circles EL1 and EL12. The rise in attenuation, thus, amounts to approximately 1.0 dB/km. A MAC value of 8.2 is thereby set. When, by contrast, a fiber insensitive to bending is employed for the two outermost light waveguides L1 and L12, namely having a MAC value of 6.8, then the rise in attenuation is significantly less in the two outer light waveguides and only reaches the values that are indicated by the points UL1, which is approximately 0.33 dB/km, and UL12, which is approximately 0.45 dB/km.

As a result of the inventive employment of light waveguides less sensitive to bending at the critical regions of the structure, substantial improvements of the overall behavior of the structure can be achieved. In detail:

attenuation values that are lower overall can be obtained upon retention of the structure;

unbeneficial processing parameters (greater curvatures, shorter lengths of lay) can be allowed at prescribed attenuation values; and a greater plurality of light waveguides can be arranged within the structure given unaltered processing parameters and unaltered attenuation.

For example, a stack format of eight light waveguides within a ribbon can be realized within a stack instead of only six light waveguides within a ribbon without having exceeded permissible tolerance values.

It is also possible to fashion all the light waveguides within a given structure with a lower bending sensitivity, i.e., for example, to design all with a MAC value of less than 7.4, preferably less than 7.0 and, potentially, even below 6.5.

Practical conditions, such as, for example, dimensioning rolls to be adhered to, can potentially not always be taken into consideration without further ado when formatting a structure with mechanically less sensitive light waveguides in those regions that are most highly stressed within the structure. A development of the invention is, therefore, based on the object of disclosing a way how a prescribed structure having light waveguides with different mechanical sensitivity can be constructed in a simple way with far-reaching consideration of practical conditions. According to the first solution of the development, this object is achieved in that the light waveguides in the region of the higher mechanical stressing each, respectively, comprises a greater layer thickness of the primary coating than the light waveguides in the region of the lower mechanical stressing.

As a result of the thickening of the first coating sheath (the primary coating) of the light waveguide in the respective region of higher mechanical stressing, these are far less exposed to micro bending influences and/or macro bending influences that could lead to inadmissibly high attenuation phenomena in the transmission behavior of the light waveguides. Due to the thickening of the primary coating, namely an additional dampening effect vis-a-vis the potential mechanical stressing, particularly pressure loads is advantageously accomplished. In addition, such light waveguides enable a differentiated, variable structural format that can be especially easily adapted to practical conditions. Due to the designational setting of the primary layer thickness of the respective light waveguides, namely prescribed space relationship, dimensioning rules of the structure, maximally allowable pressure loads on each and every light waveguide, etc., can be advantageously co-considered in the structural formatting in an especially simple way.

According to a second solution of the development, the above object is achieved in that the respective light waveguide in the region of the higher mechanical stressing comprises a softer material for the primary coating than the light waveguide in the region of the lower mechanical stressing.

Inadmissibly high transmission attenuations are also avoided with this advantageous measurement for the light waveguides at the locations of higher mechanical stressing within the structure. Given the same outside diameter, the more highly stressed light waveguides having the softer material for the primary coating are cushioned better or, respectively, mechanically damped better compared to the less stressed light waveguides. An optimized structural format that can be adapted to the many-sided conditions is enabled in this way.

It is especially advantageous to provide a greater primary layer thickness (primary coming) as well as, at the same time, a softer material for the primary coating of the more highly stressed light waveguides than for the primary coating of the less mechanically stressed light waveguides. A structure that meets many-sided conditions, such as, for example, dimensioning rules, minimum mechanical loadability (ruggedness), admissible transmission attenuations for each and every individual light waveguide, etc., can be satisfied in an especially simple way on the basis of this combined measure.

Given potential stressings, the ribbon stack ST1 of FIG. 1 essentially supports itself in a chambered space with the four corner fibers U111, U114, U131 and U134. For example, a temperature cycle, a bending or transverse pressure test can potentially lead to an increase in the attenuation of these corner forms, for example the corner fibers are the most sensitive fibers in the stack.

Figure 12:
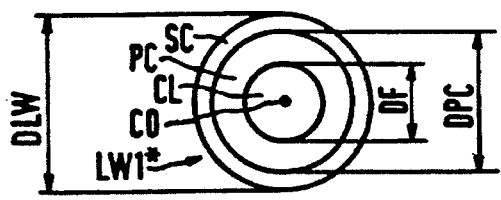
FIG. 12 is a schematic illustration of the structure of a mechanically less sensitive light waveguide for the structures of FIGS. 1–11.

A desired insensitivity of the light waveguides of the structure, preferably in the four corner regions thereof, is enabled in that the design of the coating sheath (coating design) of the optical fibers at the locations of the higher mechanical stressing is modified in comparison to that of the optical fibers in the region of lower mechanical stressing. FIG. 12 will show the structure of a light waveguide, generally indicated at LW1*, of a type that can be utilized, for example, for the mechanically less sensitive light waveguides U111 through U134 in the structure ST1 of FIG. 1. In its center, the light waveguide LW1* of FIG. 12 has an optically conductive glass core CO that is surrounded by a cladding glass or cladding layer CL so that an optofiber having an outside diameter DF is formed. At least one additional inner plastic coating or primary coming PC is applied onto this optical fiber. A softer material, such as, for example, urethane acrylate having a modulus of elasticity between 0.5 and 2.5 MPa is preferably selected for this primary coating PC. This primary coating PC is, in turn, covered with at least one second coating sheath or secondary coating SC that lies further toward the outside. A harder material than the primary coating PC is preferably selected for the secondary coating SC, for example a urethane acrylate, a silicon acrylate or epoxy acrylate having modulus of elasticity between 500 and 1500 MPa in order to largely avoid injury to the outside surface of the primary coating PC and to thereby enable a reliable, unproblematical further-processing of the optical fibers.

In order to make the light waveguides at locations of higher mechanical stressing, such as, for example, U111 through U134 of FIG. 4, within a structure ST1 less mechanically sensitive to the potentially acting pressure loads, the coatings thereof are respectively constructed so that they each respectively comprise a primary coating PC having a greater layer of thickness than the light waveguides in those positions of lower mechanical stressing, such as, for example, E112 through E133 of FIG. 1. The reason for this is that it is mainly the primary coating PC that influences the micro bending sensitivity of the light waveguides, as recited in the article from *International Wire and Cable Symposium Proceedings*, 1993, pp. 386–392. Preferably, the light waveguides, such as, for example, U111 through U134 in the region of higher mechanical pressure loads have a layer thickness of the primary coating PC that is between 1.5 to 4 times, particularly 2 through 3 times, greater than that of the light waveguides, such as, for example, E112 through E133 of FIG. 1 in the region of lower mechanical stressing. A layer thickness between 20 and 50 μm, and preferably between 30 and 40 μm is selected for the primary coating PC of the less mechanically sensitive light waveguides. Due to the thickening of the preferably soft primary coating PC, the cushioning or, respectively, buffering effect thereof is enhanced so that pressure stresses that potentially take effect on the respective optical fiber are damped and more rugged light waveguides will be obtained.

The optical fibers provided with the primary coating PC in the light waveguide LW1* of FIG. 12 preferably comprises an outside diameter DPC that is 1.1 through 1.5 times, and preferably between 1.2 and 1.4 times, greater than the mechanically more sensitive light waveguides, such as, for example, waveguides E112 through E133 of FIG. 1. The outside diameter DPC is preferably selected between 165 and 250 μm, and preferably in a range of 170 through 210 μm. The secondary coating SC of the light waveguides U111 through U134 of FIG. 1 of the lower mechanical sensitivity comprise approximately the same thickness or layer thickness that is 1.1 through 2 times greater than that of the secondary coating of the light waveguides E112 through E133 of FIG. 1 of lower mechanical stressing. The layer thickness for the secondary coating SC is preferably selected between 10 and 40 μm, and preferably between 20 and 30 μm. The light waveguides LW1* that is more mechanically rugged with respect to pressure loading, thus, comprises an overall outside diameter DLW that is 1.2 through 1.8 times, and preferably between 1.2 and 1.5 times, greater compared to the mechanically more sensitive light waveguides E112 through E133 of FIG. 1. The overall outside diameter DLW is preferably selected between 200 and 300 μm, and preferably in a range of 200 and 250 μm.

For illustrating the influences of the primary coating PC on the micro bending sensitivity of the respective light waveguide, five various coating versions T1 through T5 of light waveguides are set forth in the following Table 1. These five examples have been subject to what is referred to as a "mesh wire test" as described, for example, in *International Wire and Cable Symposium Proceedings*, 1989, p. 450. In detail, the respective overall outside diameter DLW, the optical fiber diameter DF, the outside diameter DPC of the optical fiber coated with the primary coating PC, as well as the modulus of elasticity pertaining to the primary coating PC and to the secondary coating SC are recited for the respective light waveguide types T1 through T5.

TABLE 1

| DLW [μm] | DPC [μm] | DF [μm] | Coating Version | E-Modulus of PC [MPa] | SC [MPa] |
|---|---|---|---|---|---|
| 180 | 150 | 125 | T1 | 1.6 | 1530 |
| 200 | 150 | 125 | T2 | 1.6 | 1530 |
| 200 | 165 | 125 | T3 | 1.6 | 1530 |
| 245 | 205 | 125 | T4 | 2.6 | 690 |
| 245 | 190 | 125 | T5 | 1.6 | 580 |

Figure 13:
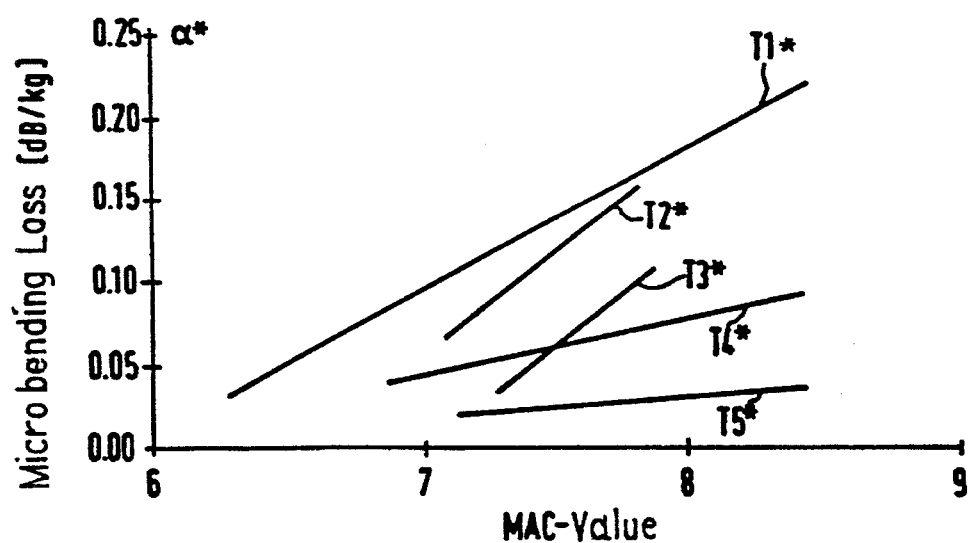
FIG. 13 is a diagram directed to the relationship between MAC values and increase in attenuation due to micro bending losses given light waveguides having coating layers of different thicknesses.

By way of example, FIG. 13 will show the respective micro bending losses or attenuation losses α* in dB/kg pressure load dependent on the respective, so-called MAC value at a wavelength of 1550 nm for a MAC range preferably between 6.5 and 8.5 and for five differently coated light waveguides T1 through T5. The MAC values preferably characterize the micro bending sensitivity of a fiber or of a light waveguide, as described on pages 704–709 from the *IWS Proceedings* of 1988. The MAC values shall be utilized below for explaining the relationships. Thereby:

$$MAC = \frac{MFD}{\lambda_{ceff}}.$$

As derived from this equation, the bending sensitivity decreases ($\lambda_{ceff}$ which is the effective critical wavelength) when the mode field diameter MFD of the respective light waveguide is made smaller. The measuring line referenced T1* in FIG. 13 for the coating version T1 of Table 1 reproduces the attenuation relationships due to micro bending losses given a standard monomode light waveguide dependent on the MAC value. Compared to this first coating version T1, the second coating is enlarged by approximately 20 μm in the second coating version T2. This leads to a measuring line or curve T2* in the attenuation diagram of FIG. 13 that lies only slightly below the measuring line or curve T1*. A far, far greater reduction or lowering of the transmission attenuation, by contrast, can be achieved on the basis of a thickening of the primary coating. This is true, for example, of the coating version T3, whose measuring line or curve T3* proceeds at a distance of approximately 0.05 dB/kg (one measured quantity unit) below the measuring line T2* as well as approximately parallel thereto.

In addition, the measuring value T4* is also entered in FIG. 13 for a coating version T4 of Table 1. This measuring line or curve T4* proceeds substantially below the measuring curve T3* and is flatter than that curve. The coating version T4 is especially distinguished by a layer thickness DPC−DF=80 μm for the primary coating that is noticeably greater when compared to the coating type T3. At the same time, a material having a lower modulus of elasticity, particularly a modulus of elasticity lower by more than half has been selected here in the exemplary embodiment for this secondary coating SC. Given this coating design T4, the additional lowering of the attenuation losses can be achieved, and this is expressed in the measuring line T4* in the relevant MAC region between 6.5 and 8.5 that proceeds flatter compared to the measured curve T3*. Given the coating version T5, finally, the light waveguide can be made nearly independent of an external pressure load in a MAC value range between 6.5 and 8.5. This preferably occurs in that the modulus of elasticity of the primary coating PC is lower in comparison to the modulus of elasticity of the type T4. This is reflected in a measured curve T5* that proceeds below that of T4* approximately in the form of a constant.

In addition to or independent of the increase in the layer thickness of the primary coating in those light waveguides which are positioned at the locations of higher mechanical stressing, particularly pressure loads, such as, for example, the waveguides U111 through U134 of FIG. 1, these waveguides can also be potentially made more insensitive to pressure and, thus, more rugged. This is accomplished by utilizing a softer material for the primary coating PC than for the primary coatings for the light waveguides, for example E112 through E113, which are located in the region of lower mechanical stressing within the structure ST1 of FIG. 1. Preferably, the light waveguides, such as, for example, U111 through U134 of FIG. 1, in the region of higher mechanical stressing, preferably, comprise a primary coating PC having an optimally lower modulus of elasticity than the light waveguides in the respective region of lower mechanical stressing. A material that is 1 through 5 times, particularly 1 through 2.5 times, softer than the material for the light waveguides E112–E133 of FIG. 1 in the respective regions of lower mechanical stressing is particularly selected for the primary coating PC of the more highly stressed light waveguides U111 through U134 of FIG. 1. A modulus of elasticity that is 1 through 5 times, and particularly 1 through 2.5 times, lower than the modulus of elasticity for the light waveguides in the region of the lower stressing is especially preferably selected for the primary coating PC of the more highly stressed light waveguides U111 through U134 of FIG. 1. Expediently, the more rugged light waveguides U111 through U134 of FIG. 1 have a modulus of elasticity between 0.5 and 3, and particularly between 1 and 2 MPa. In addition to or independent of this measure, the light waveguides in the region of high pressure loading can also be potentially made less sensitive to pressure in that a harder material is selected for the secondary coating than is selected for the less stressed light waveguides. The modulus of elasticity for the secondary coating of the more rugged light waveguides U111 through U134 is preferably selected between 1.0 and 2.5 times, particularly between 1.0 and 2.0 times, greater than the modulus of elasticity of the mechanically more sensitive light waveguides E112 and E113. The secondary coating for the mechanically more stable light waveguides U111 through U134 preferably has a modulus of elasticity between 500 and 1600 MPa, particularly between 800 and 1500 MPa. The secondary coating, thus, advantageously acts as a protective sheath so that the external forces are planarly forwarded from the secondary coating SC onto the inner coating or primary coating PC.

The influence of the modulus of elasticity of the secondary coating is, thus, essentially more negligible compared to that of the primary coating.

In a MAC value range between approximately 6.5 and 8.5, the light waveguides having the coating versions T3 through T5 in the Table thus exhibit lower micro bending losses than normally dimensioned light waveguides corresponding to the coating version of the waveguide T1. Light waveguides modified in this way are thereby preferably positioned at those locations of the structure ST1 of FIG. 1 at which the potential pressure loads can take effect. In the exemplary embodiment of FIG. 1, those are preferably the four corner positions in the ribbon stack. However, it can also be especially reliable to provide such light waveguides less sensitive to pressure in the respective corner positions in the respective ribbon stack of FIG. 1 at all ribbons B11, B12 and B13.

Figure 8:
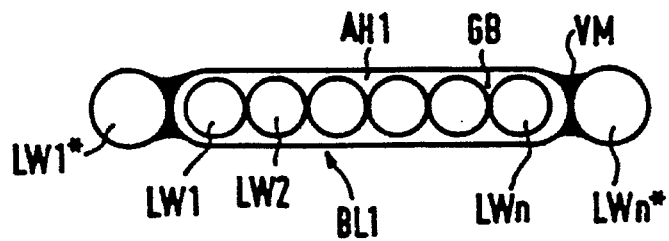
FIG. 8 is a schematic cross section through a first basic structure of a light waveguide of an optical cable of FIG. 1.

A light waveguide ribbon BL1 as a basic building block of the structure ST1 of FIG. 1 is illustrated in FIG. 8. This ribbon BL1 preferably occupies only the location of the lowermost ribbon B13 and/or the uppermost ribbon B11 of the ribbon stack or structure ST1 of FIG. 1. The other ribbons accommodated therebetween, by contrast, can be traditionally designed ribbons having the respectively same type of light waveguides. Alternatively thereto, however, all ribbons in the stack ST1 of FIG. 1 can be fashioned of the type BL1, i.e., of the same type. This alternative has the advantage that uniform multiple splicing devices can be utilized.

The ribbon BL1 is composed of light waveguide standard ribbons GB having an approximately rectangular flat plastic outside sheath AH1 as well as at least one respective additional light waveguide LW1* or LWn*. These two additional waveguides are separately attached on the outside to the rounded-off, narrow sides or edges of the standard ribbon GB in the longitudinal direction with a connecting means VM on the outside sheath AH1. The standard ribbon GB has n light waveguides LW1–LWn embedded in an outside sheath AH1, and these waveguides are, thus, laterally limited by two separate light waveguides LW1* and LWn* so that the ribbon BL1 that is broader in comparison to the standard ribbon GB is obtained. The light waveguides LW1–LWn are thereby accommodated centrally in the outside sheath AH1 along an imaginary, straight connecting line, whereas the two light waveguides LW1* and LWn* continue this imaginary connecting line at both edges of the ribbon GB without an outer protective sheath. The separate additional light waveguides LW1* and LWn* have a larger diameter in FIG. 8 than the light waveguides LW1–LWn of the standard ribbon GB. This is intended to indicate that the light waveguides, as set forth above particularly for the light waveguides U111 through U134 of FIG. 1, are provided as light waveguides LW1* and LWn* in FIG. 8. These two light waveguides LW1* and LWn* preferably comprise a greater layer thickness on their primary coating than the inwardly disposed light waveguides LW1–LWn that are subject to less pressure load and, thus, for example, particularly light waveguides corresponding to the coating type T3 of Table 1. Of course, all of the other aforementioned light waveguide types with different refractive indices for core and cladding cycles and different MAC values, as well as coating designs, come into consideration for the light waveguides LW1* and LWn* that are less sensitive to potential pressure loads, thus, for example, preferably light waveguides corresponding to the coating types T3, T4 and T5 from Table 1. An adhesive, a standard ribbon coating or some other adhesion means is preferably selected as connecting means VM for the light waveguides LW1* and LWn*.

In FIG. 8, the light waveguides LW1* and LWn* laterally limiting the standard ribbon GB act in the fashion of an edge or side wall protection for the inwardly disposed light waveguides LW1 through LWn. These two outer waveguides are, thus, placed precisely at those locations, namely the edges of the ribbon BL1, that are most highly exposed to a potentially occurring pressure load within the ribbon BL1. Since only the two light waveguides LW1* and LWn* provided at the extreme outside of the ribbon BL1 of FIG. 1 preferably respectively comprise a thickening of the primary coating, the same ribbon dimensions can nonetheless be approximately observed overall, as in the case of a standard ribbon having n+2 light waveguides of the same type within the outside sheath AH1. An especially compact ribbon BL1 is formed in this way, and this comprises two different types of waveguides, for example less pressure-resistant light waveguides LW1–LWn on the inside region defined by the outer sheath AH1, as well as two light waveguides LW1* and LWn* which are more resistant to pressure in comparison thereto and being disposed on the outside region jeopardized by potential stresses at the narrow sides or edges of the light waveguide ribbon GB. This ribbon BL1 is, thus, distinguished by a relatively high packing density as well as by an especially simple manufacture. Further, a more uniform fiber layer in the ribbon is advantageously enabled during manufacture.

Figure 9:
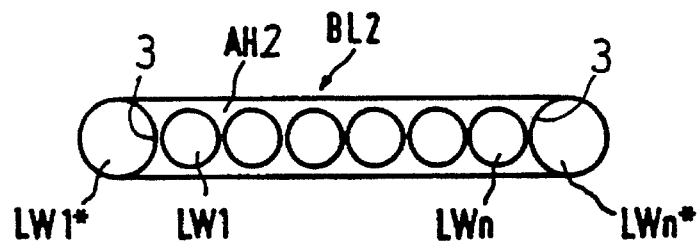
FIG. 9 is a cross sectional view of a first modification of the basic structure of FIG. 8.

In FIG. 9, a light waveguide ribbon BL2 differs from the light waveguide ribbon BL1 of FIG. 8 in that the two light waveguides LW1* and LWn* are respectively indicated as being half-sided and fit into recesses 3, 3 of the narrow side or edge of the outside sheath AH2. With their outside contour, the light waveguides LW1* and LW2* thus form a rounded-off narrow side or edge for the ribbon BL2. The light waveguides LW1* and LWn* each respectively comprise an outside diameter corresponding to the ribbon thickness so that they form a type of termination for the narrow sides of the outside sheath.

Figure 10:
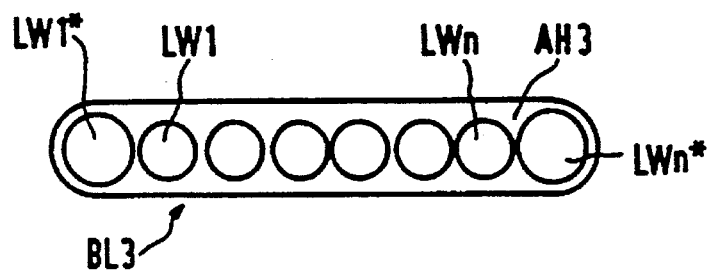
FIG. 10 is a cross sectional view of a second modification of the basic structure of FIG. 8.

An alternative to the ribbon BL2 of FIG. 9 is shown in FIG. 10 by the ribbon BL3. In this arrangement, the outer two waveguides LW1* and LWn* are completely embedded within the plastic material of the outside sheath AH3 and in common with the light waveguides LW1–LWn. In this way, the light waveguide ribbon BL3 is formed and is substantially more uniformly constructed with respect to its outside sheath AH3 since the corner or edge fibers of the ribbon BL3 are also surrounded by the protective sheath AH3.

Figure 11:
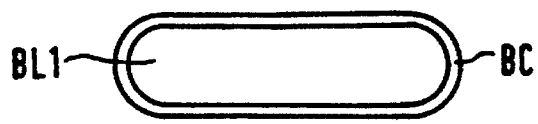
FIG. 11 is a cross sectional view of another basic structure of the light waveguide for use in the cable of FIG. 1.

An additional or independent measure with respect to the ribbon types B11 through B13 of FIG. 1, as well as BL1 through BL3 of FIGS. 8–10, is illustrated in FIG. 11. The respective light waveguide ribbon is surrounded by an additional ribbon coating BC. In FIG. 11, for example, the ribbon BL1 of FIG. 8 is completely surrounded with an additional ribbon coating BC. As illustrated, and for the sake of simplicity, the ribbon BL1 is, therefore, indicated by an approximate rectangular shape. For the sake of clarity, shadings of the ribbon coating as well as of the ribbon BL1 has been foregone. A material that has a lower modulus of elasticity, preferably a modulus of elasticity that is 1 through 5 times lower than the outside ribbon sheath AH1 already present on the ribbon, is preferably selected as an additional ribbon coating BC. Expediently, the additional ribbon coating BC has a modulus of elasticity between 50 and 500 N/mm.

The additional ribbon coating BC thus forms and additional, soft dampening or, respectively, buffer layer around the entire ribbon BL1. As warranted, a glide agent additive can be provided in, as well as between, the additional ribbon coating BC and the outside sheath of the ribbon BL1 or in the additional ribbon coating itself in order to reduce the friction between the ribbons of a stack. Stresses in the stack can thereby advantageously be reduced by compensating local excess lengths and underlengths in the cable when the cable is bent. FIG. 11 is, thus, a matter of a two-layer ribbons whose additional ribbon coating layer BC creates an additional dampening effect with respect to pressure loads. In particular, the layer thickness of the additional ribbon coating BC is selected between 10 and 40 μm, and preferably between 20 and 32 μm. The following dimensions are preferably suitable in practice:

(a) outside diameter of the light waveguides LW1*, LWn* between 0.245 and 0.300 mm;

(b) outside diameter of the light waveguides LW1–LWn between 0.10 and 0.245 mm;

(c) overall ribbon thickness (including additional ribbon coating BC) between 0.245 and 0.32 mm.

Figure 14:
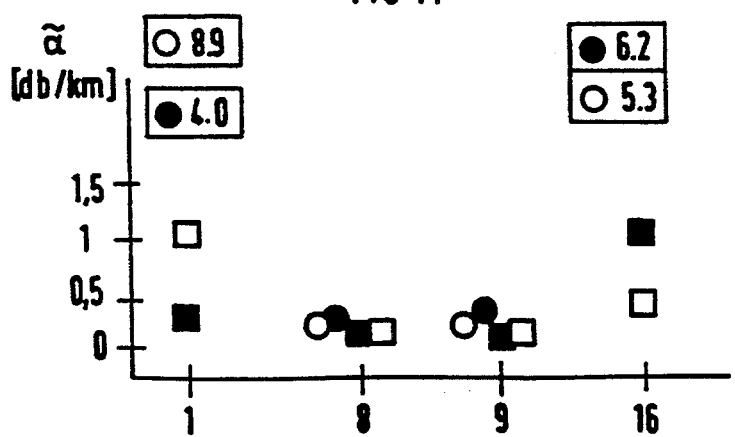
FIG. 14 is an attenuation diagram for light waveguides in the upper, middle and lower light waveguide ribbons of a ribbon stack given an optical cable having basic structures according to FIGS. 1–11.

The attenuation conditions for a rectangular ribbon stack of 16 ribbons layered on top of one another and each being of a respectively same type as the ribbon of the invention, as has been set forth, for example, in FIGS. 1–13, by comparison to a 16 ribbon stack of ribbons of a traditional type layer above one another having light waveguides that respectively have the same sensitivity to mechanical loads are illustrated in FIG. 14. The relevant measured attenuation values α are entered in the diagram of FIG. 14 in dB/km for the first, for the two middle (eighth and ninth) as well as for the last fiber position of the lowermost and the uppermost light waveguide ribbon. The relative measured values for the ribbon lying uppermost in the inventively constructed ribbon stack are thereby respectively identified with a filled-in square and the relative measured values for the ribbon lying lowermost are identified with an untilled, empty square. Relative measured values for the light waveguides of the ribbon lying uppermost in the traditional stack are symbolized with solid circles and the measured values for the ribbon lying at the bottom are symbolized with empty or unfilled circles. The measured attenuation values in the corners of the ribbon stack of the invention, i.e., the first as well as the sixteenth fiber position of the ribbon lying at the top as well as the ribbon on the bottom each lie clearly below the relative measured attenuation values (see the boxes with α=8.9; α=4.0; α=6.2 and α=5.3) of the light waveguides in the corner positions of the traditionally constructed stack. As a result of the fact that respective light waveguides that are fashioned less sensitive to potential pressure loads are provided, respectively, at the outside, i.e., at least in the corner positions of the ribbon stack, at least in the ribbon lying at the top as well as the ribbon lying at the bottom than in the less stressed regions of the ribbon stack structure, a noticeable reduction in the transmission attenuation of the light waveguides in the corner positions of the ribbon stack can be achieved. In particular, a reduction in the increase of attenuation by a factor of 2 through 12 occurs given the same cable diameter in comparison to the ribbon stack having a standard ribbon. Further, the attenuation diagram of FIG. 14 shows clearly that the light waveguides in the middle fiber positions, i.e., for example, at the eighth and ninth position of the respective ribbon, have approximately the same transmission attenuation in the ribbon stack of the invention as well as in the traditional ribbon stack. These local fiber positions thus remain largely free of micro bending within the structure. Measured attenuation values below 0.3 dB/km at a wavelength of 1550 nm can preferably be achieved with the inventive structure of the ribbon stack having the basic structure corresponding to FIGS. 1–11, particularly FIGS. 8–11, even for light waveguides in the corner positions of the ribbon stack ST1 of FIG. 1. The middle fiber positions in the respective ribbon can be preferably occupied by light waveguides that have a greater sensitivity to micro bending since they are less jeopardized by potential pressure loads.

A structure that is resistant particularly to potential pressure loads occurs in that case wherein all light waveguide ribbons of the stack structure ST1 of FIG. 1 are replaced by identical light waveguide ribbons having one and the same embodiment. For example, preferably, according to FIGS. 1–11, particularly FIGS. 8–11, the stack is constructed with identical ribbons. The light waveguides that are less mechanically sensitive then lie on an imaginary rectangular outside frame that surrounds the inwardly disposed other light waveguides in the less jeopardized region.

Such ribbons constructed according to FIGS. 1–11, particularly FIGS. 8–11, are suitable for many-sided applications in light waveguide technology. Thus, for example, for insertion into the chambers of a chambered line, such as the chambered cable of FIG. 3 or a U-shaped cable, such as illustrated in FIG. 1 or in a bundle cable as shown in FIG. 4.

Although various minor modifications may be suggested by those versed in the art, it should be understood that we wish to embody within the scope of the patent granted hereon all such modifications as reasonably and properly come within the scope of our contribution to the art.

We claim:

1. In an optical cable having a plurality of light waveguides being arranged in at least one group having a prescribed structure, the individual light waveguides within the prescribed structure being respectively exposed to different mechanical stresses, the improvements comprising light waveguides with different mechanical sensitivities being within the prescribed structure, light waveguides having a lower mechanical sensitivity being arranged in at least one region of the prescribed structure in which elevated mechanical stresses occur, and light waveguides having a higher mechanical sensitivity being arranged in at least one region of the prescribed structure in which lower mechanical stresses occur.

2. In an optical cable according to claim 1, wherein the prescribed structure has a neutral axis and the light waveguides having the lower mechanical sensitivity are arranged within the structure where the light waveguides have the greatest distance from the neutral axis.

3. In an optical cable according to claim 2, wherein light waveguides having a minimum distance from the neutral axis are fashioned as light waveguides having the higher mechanical sensitivity.

4. In an optical cable according to claim 1, wherein the prescribed structure has a cross section with connecting lines between outwardly disposed light waveguides which are disposed in corners of the prescribed structure, said outwardly disposed light waveguides having lower mechanical sensitivity than the light waveguides spaced inward therefrom.

5. In an optical cable according to claim 1, wherein the light waveguides with the lower mechanical sensitivity have a lower MAC value than the remaining light waveguides, wherein MAC is established by $$MAC = MFD/\lambda_{ceff}$$

wherein MFD is a mode field diameter of optical fibers and $\lambda_{ceff}$ is the effective critical wavelength.

6. In an optical cable according to claim 5, wherein the MAC values below 7.4 are selected for the light waveguides having lower mechanical sensitivity, wherein $\lambda = 1300$ nm.

7. In an optical cable according to claim 5, wherein the MAC value for the light waveguides having a higher mechanical sensitivity and the light waveguides having a lower mechanical sensitivity differs by at least 0.5.

8. In an optical cable according to claim 5, wherein the MAC value for the light waveguides having a higher mechanical sensitivity and the light waveguides having a lower mechanical sensitivity differs by at least 1.

9. In an optical cable according to claim 5, wherein all of the light waveguides of the prescribed structure have a MAC value below 7.4.

10. In an optical cable according to claim 5, wherein all of the waveguides of the prescribed structure have a MAC value below 7.0.

11. In an optical cable according to claim 1, wherein light waveguides within the prescribed structure which would experience an increase in attenuation beyond an allowable limit value due to the arrangement of the prescribed structure in a finished cable are replaced by light waveguides having a lower mechanical sensitivity.

12. In an optical cable according to claim 1, wherein the prescribed structure is arranged within a U-shaped chamber element which is stranded together with other U-shaped chamber elements.

13. In an optical cable according to claim 1, wherein the prescribed structure is accommodated within a chamber element that has substantially a trapezoidal cross section.

14. In an optical cable according to claim 1, which includes a profile member provided with chamber-like depressions extending the length thereof, said prescribed structure being arranged in said chamber-like depression respectively.

15. In an optical cable according to claim 1, wherein the prescribed structure is accommodated in a closed protective sheath to form a stranded element and in that a plurality of said stranded elements are stranded to form a cable core.

16. In an optical cable according to claim 1, wherein each of the waveguides has a primary coating, and each light waveguide in the region of the elevated mechanical stresses has a primary coating with a greater layer thickness than the layer thickness of the primary coatings of the light waveguides in the region of lower mechanical stresses.

17. In an optical cable according to claim 16, wherein each light waveguide in the region of elevated mechanical stresses has a primary coating with a layer thickness that is greater than 1.5 through 4 times the layer thickness of the primary coating of the light waveguides in the regions of lower mechanical stresses.

18. In an optical cable according to claim 16, wherein each light waveguide in the region of the elevated mechanical stresses has a primary coating with a layer thickness that is two through three times the thickness of the primary coatings of the light waveguides in the region of lower mechanical stresses.

19. In an optical cable according to claim 16, wherein the primary coating of each light waveguide in the region of elevated mechanical stresses has a layer thickness between 0.02 and 0.05 mm.

20. In an optical cable according to claim 19, wherein the layer thickness of the primary coating of the light waveguide in the region of elevated mechanical stresses has a thickness between 0.03 and 0.04 mm.

21. In an optical cable according to claim 1, wherein each light waveguide has a primary coating with a primary coating of each light waveguide in the region of elevated mechanical stresses being of a softer material than the primary coatings of the light waveguides in the region of lower mechanical stresses.

22. In an optical cable according to claim 21, wherein the primary coating of each light waveguide in the region of elevated mechanical stresses is one to five times softer than the primary coatings of the light waveguides in the region of lower mechanical stresses.

23. In an optical cable according to claim 22, wherein the primary coating of each light waveguide in the region of elevated mechanical stresses is 1 to 2.5 times softer than the primary coatings of the light waveguides in the region of lower mechanical stresses.

24. In an optical cable according to claim 21, wherein the primary coating of each light waveguide in the region of elevated mechanical stresses has a primary coating of urethane acrylate having a modulus of elasticity between 0.5 and 2.5 MPa.

25. In an optical cable according to claim 1, wherein the light waveguides in the prescribed structure are arranged as a waveguide ribbon, wherein a light waveguide lying adjacent an outside edge of the waveguide ribbon have a lower mechanical sensitivity than the light waveguides lying farther toward an inside of the waveguide ribbon.

26. In an optical cable according to claim 25, wherein a plurality of waveguide ribbons are combined to form a stack of ribbons to form the prescribed structure.

27. In an optical cable according to claim 25, wherein the waveguide ribbon is formed by a standard ribbon with light waveguides having substantially the same mechanical sensitivity, and at least one light waveguide having a lower mechanical sensitivity being secured at an edge of the standard ribbon and aligned with the waveguides of said standard ribbon.

28. In an optical cable according to claim 25, wherein the waveguide ribbon has a row of light waveguides with the outer light waveguides having a lower mechanical sensitivity than the remaining light waveguides of the waveguide ribbon.

29. In an optical cable according to claim 25, wherein the light waveguides having the lower mechanical sensitivity occupy an outer edge of the waveguide ribbon and terminate an outer sheath thereof.

30. In an optical cable according to claim 25, wherein the waveguide ribbon has the light waveguides having the higher mechanical sensitivity disposed in the waveguide ribbon and has the waveguide with the lower mechanical sensitivity on each edge of the waveguide ribbon, all of said waveguides being embedded in an outside sheath of the waveguide ribbon.

31. In an optical cable according to claim 25, wherein the waveguide ribbons has an additional protective layer surrounding the waveguide ribbon.

32. In an waveguide cable according to claim 26, wherein each of the optical ribbons has an identical structure with light waveguides having a higher sensitivity being disposed in the interior of the waveguide ribbon and the outer edges of each waveguide ribbon having at least one light waveguide with a lower mechanical sensitivity.

33. In an optical cable according to claim 26, wherein an uppermost and lowermost ribbon of the stack of ribbons have interior light waveguides of a higher mechanical sensitivity and at least one outer light waveguide being of a lower mechanical sensitivity.

34. In an optical cable having a plurality of light waveguides being arranged in a prescribed structure having at least one region being exposed to elevated mechanical stresses and at least one second region being exposed to lower mechanical stresses than the one region, the improvements comprising the light waveguide of the prescribed structure being in at least two groups having different mechanical sensitivities with one group having a lower mechanical sensitivity than the other group of the two groups being arranged in the one region and the other group being arranged in the second region.

35. An optical cable comprising a plurality of light waveguides being arranged in at least one group having a prescribed structure with a neutral axis, the individual light waveguides within said prescribed structure being respectively exposed to different mechanical stresses with light waveguides in at least one outside region having a greater distance from the neutral axis being exposed to higher mechanical stresses than light waveguides in at least one inside region adjacent the neutral axis, the plurality of light waveguides being formed by light waveguides having different mechanical sensitivities with light waveguides having a lower mechanical sensitivity than the other light waveguides being arranged in the outside region of the prescribed structure and with the other waveguides with a higher mechanical sensitivity being disposed in the inside region adjacent the neutral axis of the prescribed structure so that elevated stresses applied to the light waveguides in the outside region will not create an excessive increase in attenuation.

* * * * *